US005721664A

United States Patent [19]

Uken et al.

[11] Patent Number: 5,721,664

[45] Date of Patent: Feb. 24, 1998

[54] SURGE ARRESTER

[75] Inventors: William David Uken, Fremont; Corey J. McMills, Los Altos; Robert J. Ritter, Fremont, all of Calif.

[73] Assignee: Raychem Corporation, Menlo Park, Calif.

[21] Appl. No.: 767,053

[22] Filed: Dec. 16, 1996

[51] Int. Cl.[6] .......... H02H 1/00

[52] U.S. Cl. .......... 361/125; 361/127

[58] Field of Search .......... 361/117, 126, 361/127, 124, 125; 338/21; 337/19, 31, 34

[56] References Cited

U.S. PATENT DOCUMENTS

| | | | |
|---|---|---|---|
| 3,725,745 | 4/1973 | Zisa | 317/104 |
| 3,987,343 | 10/1976 | Cunningham et al. | 317/61.5 |
| 4,148,135 | 4/1979 | Sakshaug et al. | 29/621 |
| 4,212,045 | 7/1980 | Martzloff | 361/127 |
| 4,218,721 | 8/1980 | Stetson | 361/117 |
| 4,240,124 | 12/1980 | Westrom | 361/127 |
| 4,249,224 | 2/1981 | Maumbach | 361/124 |
| 4,364,021 | 12/1982 | Levinson | 338/20 |
| 4,439,807 | 3/1984 | Reitz | 361/127 |
| 4,471,402 | 9/1984 | Cunningham | 361/125 |
| 4,706,060 | 11/1987 | May | 338/20 |
| 4,720,760 | 1/1988 | Starr | 361/128 |
| 4,736,269 | 4/1988 | Amein et al. | 361/128 |
| 4,785,276 | 11/1988 | May | 338/21 |
| 4,794,485 | 12/1988 | Bennett | 361/127 |
| 4,901,187 | 2/1990 | Allina | 361/117 |
| 4,907,119 | 3/1990 | Allina | 361/56 |
| 4,975,674 | 12/1990 | Sumiyoshi et al. | 338/21 |
| 5,124,876 | 6/1992 | Misencik et al. | 361/117 |
| 5,130,884 | 7/1992 | Allina | 361/117 |
| 5,140,491 | 8/1992 | Allina | 361/56 |
| 5,148,345 | 9/1992 | Allina | 361/104 |
| 5,299,088 | 3/1994 | Honl | 361/119 |
| 5,341,271 | 8/1994 | Hutchinson | 361/123 |

OTHER PUBLICATIONS

Brochure entitled, "PolyGarde–Metal oxide surge arresters without series gap for low–voltage distribution systems," by Raychem Corporation, dated Feb. 1996.

*Primary Examiner*—Jeffrey A. Gaffin
*Assistant Examiner*—Sally Medley
*Attorney, Agent, or Firm*—Herbert G. Burkard; Yuan Chao

[57] ABSTRACT

A surge arrester designed for use with lines of 2 kV or less has a housing (10) which, in combination with a cup-shaped gasket (25), an O-ring gasket (45) and a lid (20), seals a varistor element (30) inside against environmental contaminants such as water or pollutants.

24 Claims, 6 Drawing Sheets

SURGE ARRESTER

BACKGROUND Of THE INVENTION

Surge arresters protect equipment connected to power distribution networks from damage by excessive voltage resulting from lighting strikes, switching surges, incorrect connections, and other abnormal conditions or malfunctions. The active element may be a varistor, also referred to as a non-linear resistor because it exhibits a nonlinear current-voltage relationship. If the applied voltage is less than a certain voltage (the switching or clamping voltage) the varistor is essentially an insulator and only a small leakage current flows through it. If the applied voltage exceeds the switching voltage, the varistor resistance drops, allowing an increased current flow. That is, a varistor is highly resistive below its switching voltage and substantially conductive above it. The voltage-current relationship is described by the equation $$I=\left(\frac{V}{C}\right)^{\alpha}$$

where I is the current flowing through the varistor; V is the voltage across the varistor; C is a constant which is a function of the dimensions, composition, and method of fabrication of the varistor; and α (alpha) is a constant which is a measure of the nonlinearity of the varistor. A large α, signifying a large degree of nonlinearity, is desirable.

A surge arrester is commonly attached to an electrical power system in a parallel configuration, with one terminal (or electrode) of the device connected to a phase conductor of the electrical power system and the other terminal to ground or neutral. At normal system voltages, the surge arrester is resistant to current flow (except for the leakage current). But if an overvoltage condition exceeding the switching voltage develops, the surge arrester becomes conductive and shunts the surge energy to ground while "clamping" or limiting the system voltage to a value which can be tolerated by the equipment being protected.

Power lines protected by surge arresters range in voltage from hundreds of kilovolts to hundreds of volts. The current carrying capacity and switching voltage of a surge arrester—and therefore its physical size—is selected according to the type of line protected. The present invention relates to surge arresters for lines of less than 2 kV, typically less than 1 kV, such as 440 or 280 V, which are generally referred to in the power distribution field as "low voltage" lines. For such surge arresters, important factors in addition to their electrical characteristics are compactness, cost of manufacture, ease of assembly and installation, safety during internal faults, and durability despite exposure to severe environmental conditions.

The varistor element should be sealed from the environment because ingress of moisture or pollutants can cause shorting. Also, when the varistor is operating in its substantially conductive state, there should be no exposed surfaces in contact with an ionizable medium such as air. The high voltages involved may cause flashover, in which current is carried not through the body of the varistor material, but along the exposed surface because of the ionization of the medium. Also, exposed varistor surfaces may be contaminated with ionic or conductive species which can initiate flashover. It is customary to seal a varistor by insert molding or pouring or potting a material such as a silicone around it. However, insert molding requires specialized equipment and has long cycle times, both of which may be significant cost factors. Potting or pouring is inefficient, as production times are prolonged by the time needed for the silicone to cure. It is desirable to develop a surge arrester where the sealing of the varistor is not dependent on either an insert molding or a pouring or potting step to seal the varistor.

SUMMARY OF THE INVENTION

This invention provides a surge arrester comprising (a) a first electrode having (i) a first contact plate with interior and exterior faces and (ii) a first shank projecting from the exterior face of the first contact plate;

(b) a second electrode having (i) a second contact plate with interior and exterior faces and (ii) a second shank projecting from exterior face of the second contact plate;

(c) a substantially disk-shaped varistor element, the first and second electrodes sandwiching the varistor element therebetween with the interior faces of the first and second contact plates facing the varistor element and making electrical contact therewith, to form a core assembly;

(d) a cup-shaped gasket having a sidewall and a substantially circular base with a through-hole, the gasket containing the core assembly, with the exterior face of the first contact plate facing the base of the gasket, the first shank passing through the through-hole of the base, and the second shank extending from the open end of the gasket;

(e) a housing having a sidewall and a base with a through-hole; the housing containing the core assembly and the gasket, with the open end of the gasket facing the base of the housing, the first shank extending from the open end of the housing, and the second shank passing through the through-hole in the base of the housing;

(f) a sealing element for the through-hole in the base of the housing; and (g) a lid with a through-hole, the lid covering the open end of the housing such that the first shank passes through the through-hole in the lid, being engaged and retained in place by an engagement means on the sidewall of the housing, and applying a compressive force to the gasket and the core assembly;

the varistor element being sealed from the external environment by seals between the lid and the base of the gasket; between the base of the gasket and the first contact plate; between the sidewall of the housing and the sidewall of the gasket; between the through-hole of the base of the housing and the sealing element; and between the second electrode and the sealing element.

In another embodiment of the invention, there is provided a kit of parts for forming a surge arrester, comprising (a) a first electrode having (i) a first contact plate with interior and exterior faces and (ii) a first shank projecting from the exterior face of the first contact plate;

(b) a second electrode having (i) a second contact plate with interior and exterior faces and (ii) a second shank projecting from exterior face of the second contact plate;

(c) a substantially disk shaped varistor element; capable of forming, in combination with the first and second electrodes, a core assembly wherein the varistor element is sandwiched between the first and second electrodes with the interior faces of the first and second contact plates facing the varistor element and making electrical contact therewith;

(d) a cup-shaped gasket having a sidewall and a substantially circular base with a through-hole; the gasket capable of containing the core assembly, with the exterior face of the first contact plate facing the base of the gasket, the first shank passing through the through-hole of the base, and the second shank extending from the open end of the gasket;

(e) a housing having a sidewall and a base with a through-hole; the housing capable of containing the core assembly and the gasket, with the open end of the gasket facing the base of the housing, the first shank extending from the open end of the housing, and the second shank passing through the through-hole in the base of the housing;

(f) a sealing element for the through-hole in the base of the housing; and (g) a lid with a through-hole, the lid capable of covering the open end of the housing such that the first shank passes through the through-hole in the lid, the lid is engaged and retained in place by an engagement means on the sidewall of the housing, and the lid applies a compressive force to the gasket and the core assembly.

BRIEF DESCRIPTION OF THE DRAWING(S)

FIG. 1 is an exploded view of a surge arrester of this invention. FIGS. 2–4 are different views of various components of the surge arrester of FIG. 1. FIG. 5 is a cross section view of the surge arrester of FIG. 1 after assembly.

Reference numerals repeated from one figure to another denote the same or like elements.

DESCRIPTION OF THE PREFERRED EMBODIMENTS

Figure 1:
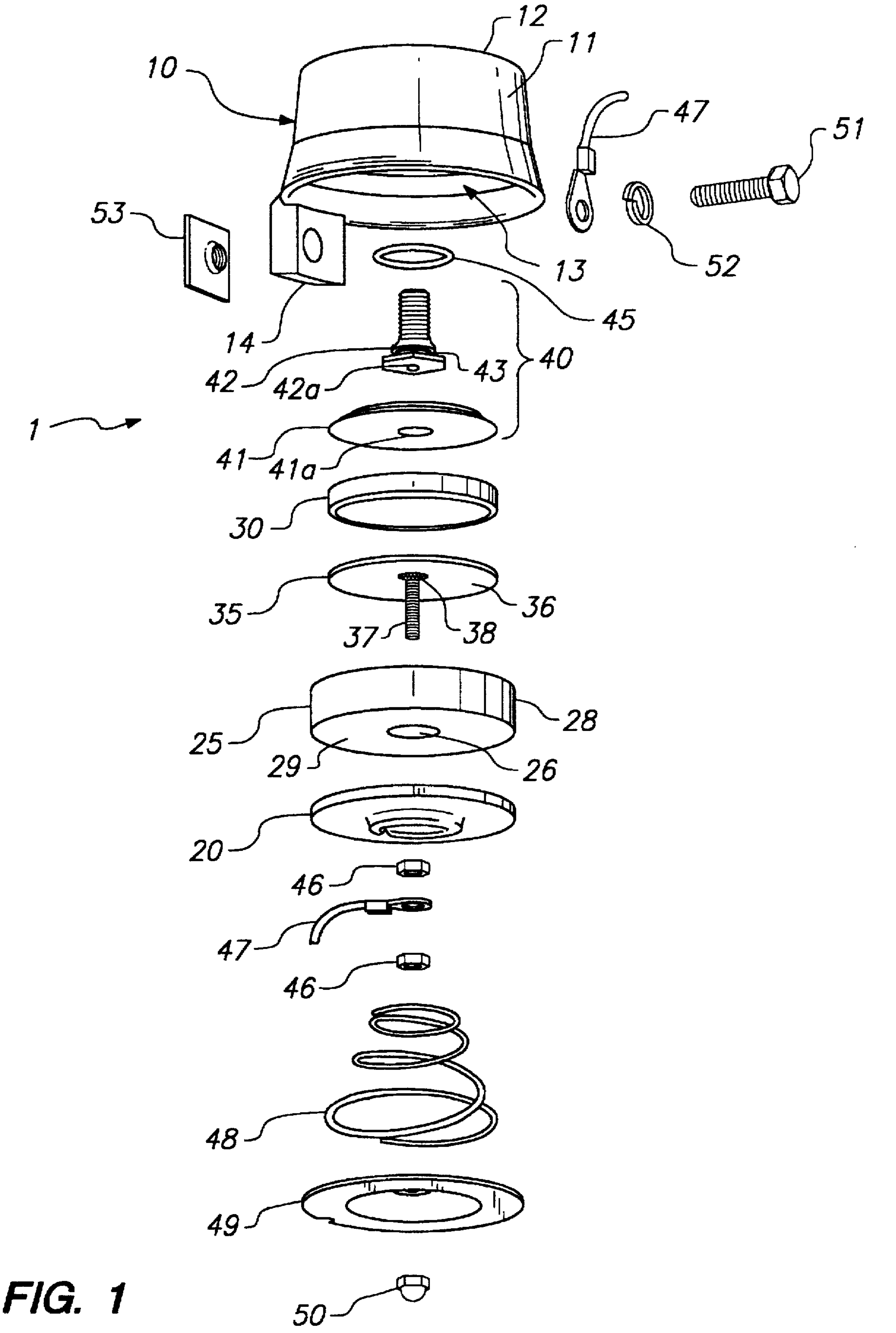

The invention is now described by reference to various preferred embodiments, particularly as depicted in the figures. To start, FIG. 1 is an exploded view of a preferred surge arrester 1, which includes a varistor element 30, a first electrode 35, and a second electrode 40. These three elements form the core assembly of the surge arrester, that is, the part which performs the actual surge arresting function. Electrodes 35 and 40 have respective contact plates 36 and 41, each contact plate having an exterior and an interior face. Contact plates 36 and 41 are shown in a preferred substantially disk-like shape, but other shapes are permissible. Electrodes 35 and 40 sandwich varistor element 30 between them, with the interior faces of contact plates 36 and 41 facing varistor element 30 and establishing electrical contact therewith. Actual direct physical contact between contact plates 36 and 41 and varistor element 30's faces is preferable but is not required. Variations in which contact plates are separated from varistor element 30 by, for example, a metallic spacer (not shown), are included within the scope of this invention as there still will be electrical contact. Spacers may be used, for example, to allow for manufacturing variations in the thickness of varistor element 30, so that the core assembly's size remains constant. Each electrode 35 and 40 also has, projecting from its exterior face and positioned approximately at the center thereof, a respective shank 37 and 42. In the preferred embodiment shown, electrode 35 is in single-piece form, with shank 37 affixed to contact plate 36 by a fusible, electrically conductive material 38, such as solder. Conversely, electrode 40 preferably is of a two-piece construction, with contact plate 41 constituting a piece separate from shank 42. Optionally, shank 42 may have a post 42*a* which fits into a matingly sized hole 41*a* in contact plate 41, for the purpose of improving alignment and/or electrical contact. Alternatively but less preferably, electrode 40 may be of one piece construction, with contact plate 41 and shank 42 being bonded together or of integral construction. Near the base of shank 42 is an annular groove 43, into which can be seated O-ring 45.

Typically, when installed, electrode 40 is connected to the system (i.e., it is the "hot" electrode), while electrode 35 is connected to ground (i.e., it is the "ground" electrode). While both electrodes 40 and 35 are commonly characterized in having a shank portion and a contact plate portion, the electrodes and their respective components are not necessarily the same in size and/or shape and, in practice, usually differ, as shown here. Preferably, to facilitate connection to other hardware, shanks 37 and 42 are threaded.

Varistor element 30 is generally in the shape of a disc or flattened cylinder. Those skilled in the art will appreciate that, although varistor element 30 is shown in FIG. 1 as being a single varistor disk, it may be formed from a stack of plural varistor disks, as is commonly done in the art.

The core assembly of electrodes 35 and 40 and varistor element 30 is contained in a gasket 25, which is generally cup shaped and has a base 29, typically substantially circular in shape, and a sidewall 28. Base 29 has a through-hole 26, approximately in the center thereof. When the core assembly is nested inside gasket 25, the exterior face of contact plate 36 faces the inside face of base 29 and shank 35 passes through through-hole 26. The exterior face of contact plate 41 preferably is substantially level with the top of sidewall 28.

The nested arrangement of gasket 25 and the core assembly is itself contained inside a housing 10, which is generally cup-shaped and has a substantially circular base 12 and a sidewall 11, which is preferably but optionally tapered as shown. Base 12 has a through-hole 15, approximately in the center thereof (not visible in FIG. 1; see FIG. 4). (Surge arrester 1 is typically installed with base 12 facing upwards, as shown here, so that housing 10 also may be said to have a generally inverted cup or frusto-conical shape.) Gasket 25 fits inside housing 10 with gasket 25's open end facing base 12. Shank 42 passes through through-hole 15, while shank 37 projects from the open end of housing 10.

Figure 2:
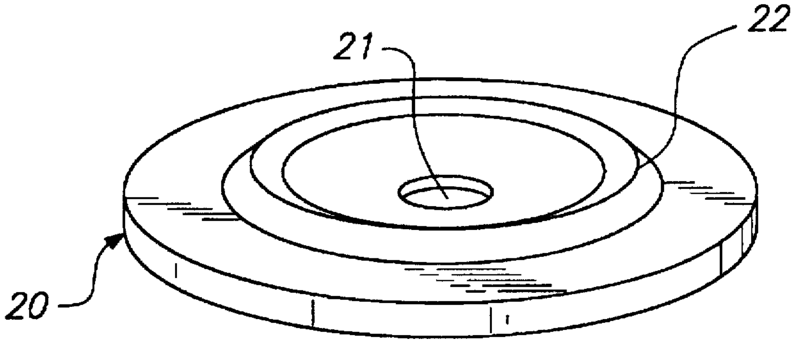

To cover the open end of housing 10, there is provided a lid 20, which has a through-hole 21 approximately in the center thereof (again not visible in FIG. 1; see FIG. 2). Lid 20 snaps into an annular groove 13 on the inside of sidewall 11 and is thus held in place. When lid 20 is in place, shank 37 passes through through-hole 21.

Figure 3:
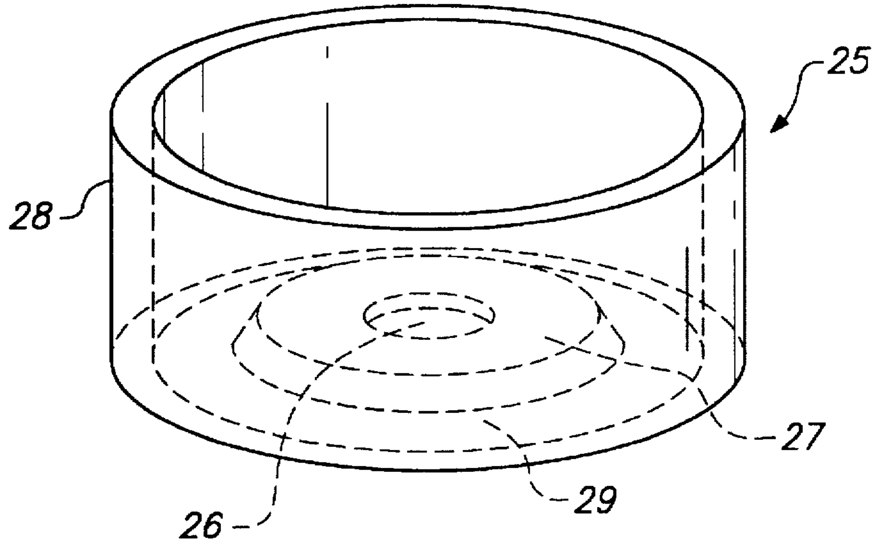
Figure 4:
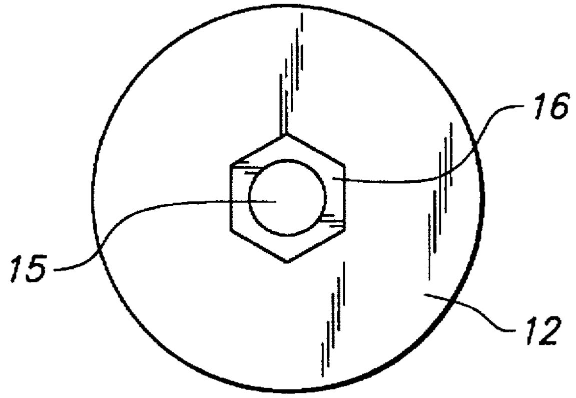

Reference is also made to FIGS. 2 through 4, which show different views of the aforementioned components to reveal elements not visible in the view of FIG. 1.

FIG. 2 is a perspective view of the underside of lid 20 (the side facing gasket 25). Here, through-hole 21 is visible, as is an optional preferred annular ridge 22 surrounding through-hole 21.

FIG. 3 is a perspective view of gasket 25 from its open end, revealing an optional preferred annular protrusion 27 on base 29 and surrounding through-hole 26. When viewed in profile, protrusion 27 is generally shaped like a flat-topped plateau or mesa, preferably with sloped sides.

FIG. 4 is a plan view of the inside of base 12, revealing through-hole 15. Surrounding through-hole 15 is a shallow recess or depression 16, in this particular embodiment hexagonal in shape. Recess 16 matingly receives the complementarily sized and shaped hexagonal head of shank 42, the head acting as a registering element, thereby preventing rotation of shank 42. Typically in use shank 42 is an attachment point for hardware, electrical or otherwise. To facilitate such attachment, for example where shank 42 is threaded and a nut is threaded thereonto, it is desirable to prevent rotation of shank 42 relative to housing 10, as provided for here. Those skilled in the art will understand that variations of the above embodiment are permissible and within the scope of this invention, for example combinations of the recess and the head having a size and/or shape other than the ones specifically described. Or, where shank 42 and contact plate 41 are of one-piece construction, recess 16 need not surround through-hole 15, but can be offset therefrom and positioned to receive a pin or other registering element projecting from the exterior face of contact plate 41.

As previously mentioned, it is important to protect varistor element 30 from the environment. Even though during typical use surge arrester 1 is oriented with base 12 on top, so that only through-hole 15 directly faces falling rain, surge arrester 1 may be buffeted by winds, causing its underside to also be exposed. Further, moisture may deposit on any surface. Condensation or mist is a particularly severe threat in coastal areas or localities where the air is highly polluted, because the condensation or mist may then contain dissolved therein salt or other wind-borne, ionically conducting species.

Figure 5:
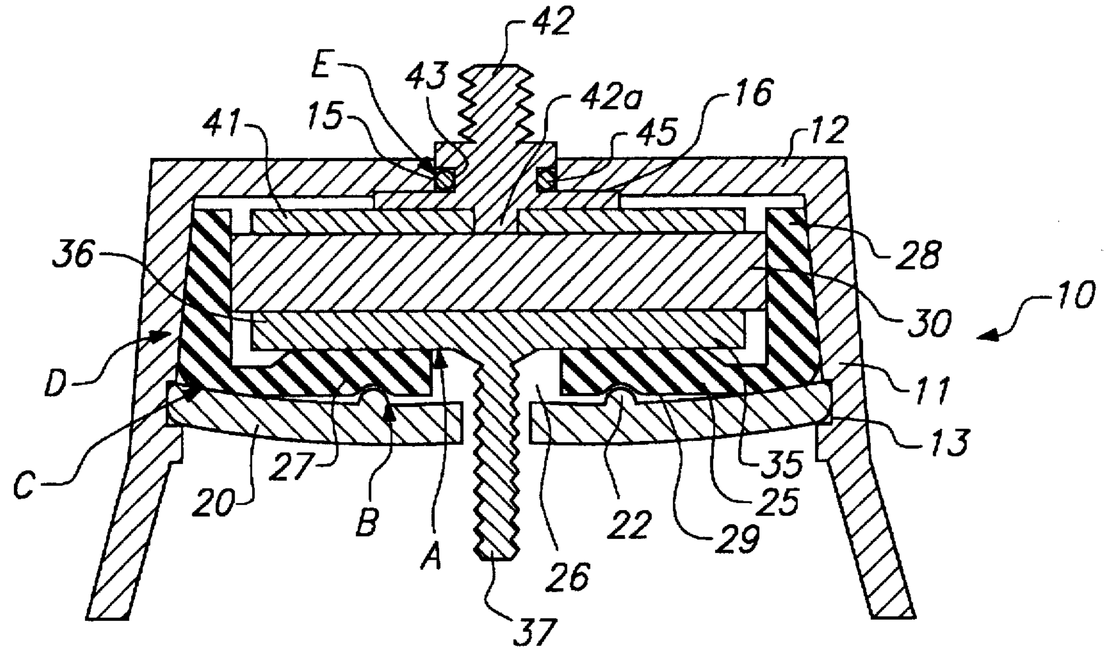
Figure 6A:
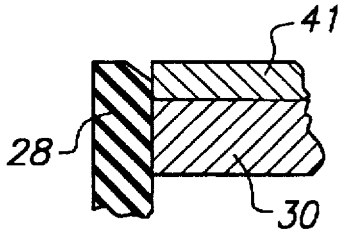
FIG. 6a–6j show alternative or optional features of the instant surge arrester.
Figure 6B:
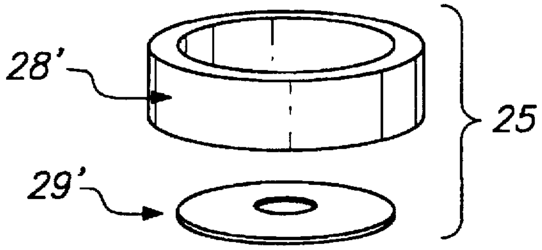
Figure 6C:
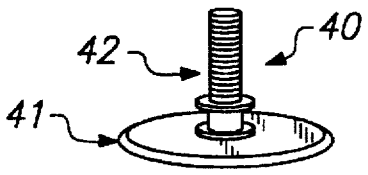
Figure 6D:
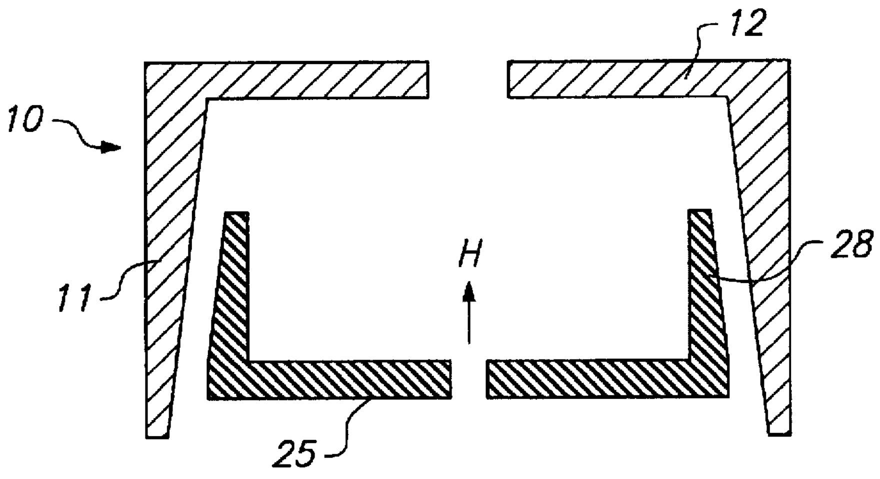
Figure 6E:
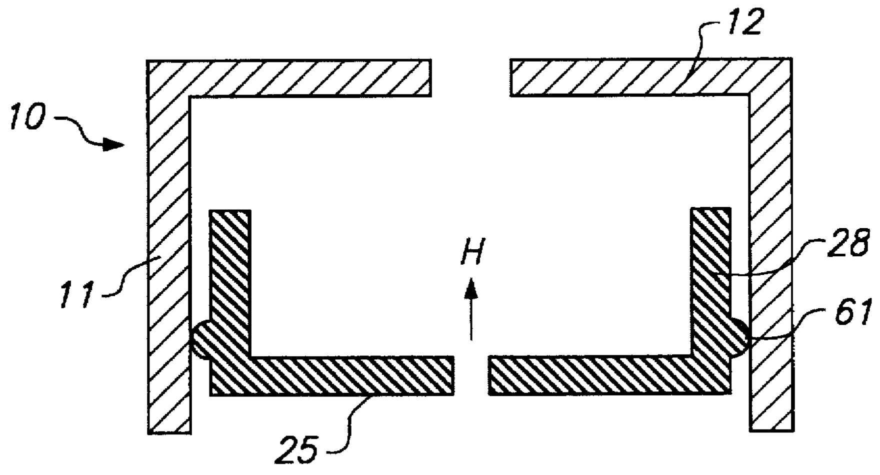
Figure 6F:
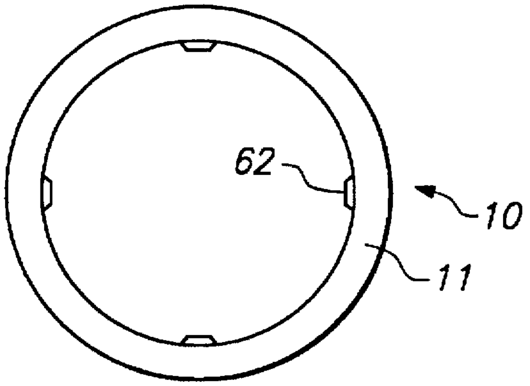
Figure 6G:
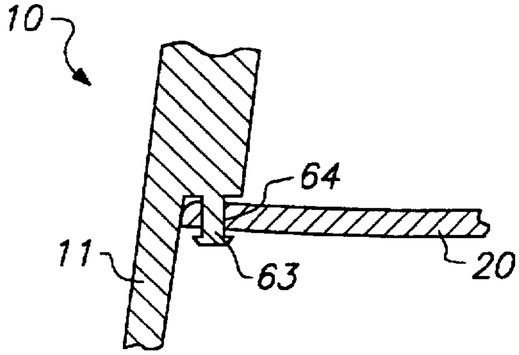
Figure 6H:
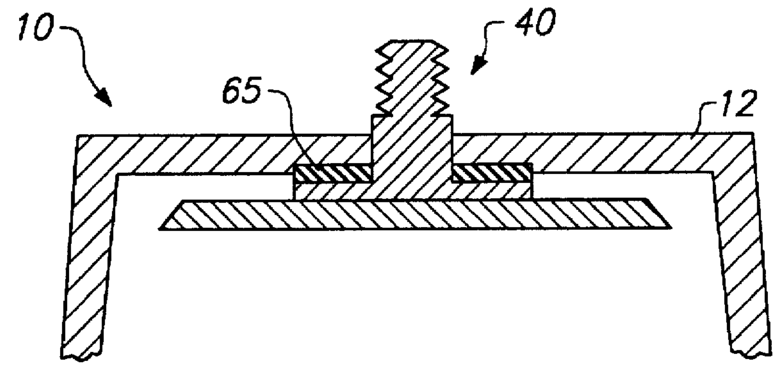
Figure 6J:
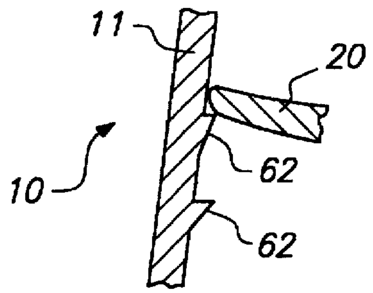
Figure 6I:
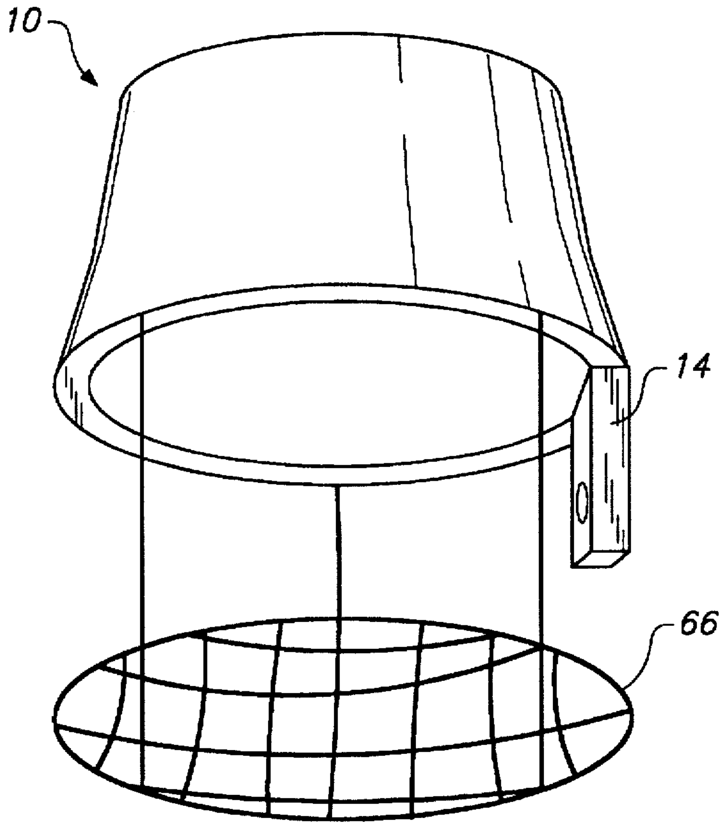
Figure 7A:
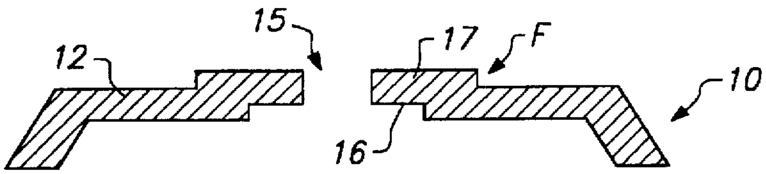
FIGS. 7a–7c and 8a–8b show how surge arresters of this invention may be designed to improve their water-shedding capabilities.
Figure 7B:
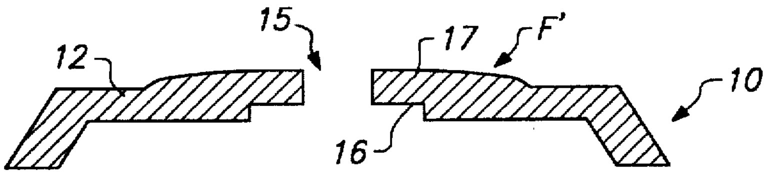
Figure 7C:
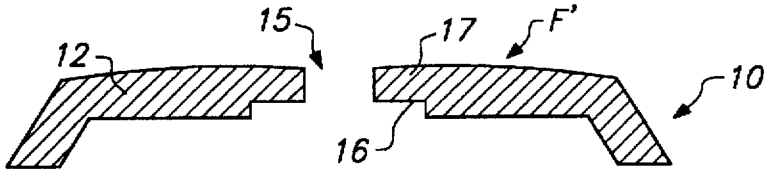
Figure 8A:
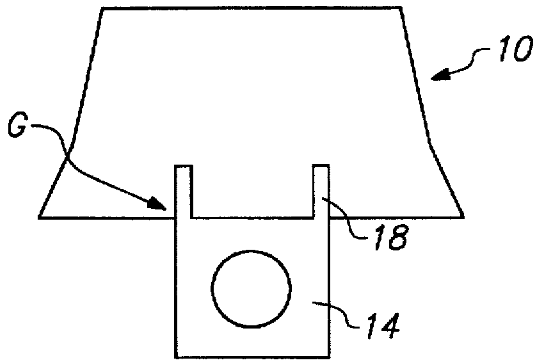
Figure 8B:
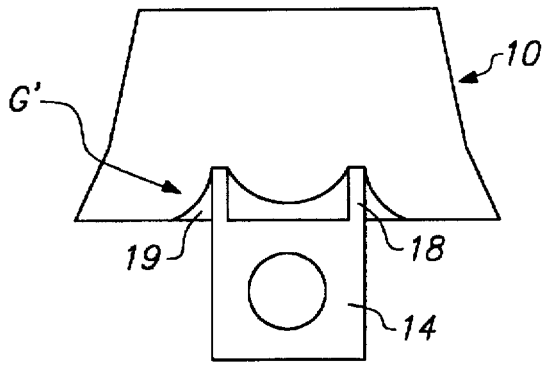

FIG. 5 shows how a surge arrester of this invention has seals preventing water ingress from all possible entry points. (It is to be understood that the following discussion refers to sealing against the entry of "water" for convenience, but that the sealing principles described are also applicable to other environmental agents.) This figure is a vertical cross-section view of surge arrester 1, taken through its center. When engaging groove 13 and being retained thereby, lid 20 presses down on gasket 25 and the core assembly, thereby applying a compressive force on them. Lid 20 is like a diaphragm under pressure from the inside components and consequently is slightly buckled outward. Because shank 37 fits loosely in through-hole 21, water can easily pass through the latter. However, the water's further progress is blocked by a seal formed by gasket 25 pressing against contact plate 36 (preferably with participation by protrusion 27, as shown), at the location indicated by arrow A, and by a seal formed by lid 20 pressing against gasket 25 (preferably with participation by ridge 22, as shown), at the location indicated by arrow B. A further seal between lid 20 and gasket 25 is created at the shoulder of gasket 25, indicated by arrow C, by the pressure exerted thereon by gasket 25. The compression applied by lid 20 and the taper in sidewall 11 force sidewall 28 of gasket 25 and sidewall 11 of housing 13 against each other. In the event water is able to bypass the previously mentioned seals or enter between lid 20 and groove 13, the two sidewalls press together to form a seal (arrow D) preventing further travel of the water. (There is some sealing interaction between lid 20 and groove 13, but because both housing 10 and lid 20 are made of relatively rigid materials, this seal is not entirely reliable.) The last remaining potential entry point for water is through-hole 15 at base 12 of housing 10. The interference fit of O-ring 45 between the walls of hole 15 and groove 43 results in O-ring 45 being radially compressed and forming a seal preventing water from entering through through-hole 15 (arrow E). Thus, O-ring 45 acts as a sealing means for preventing water ingress via through-hole 15. In summary, seals are formed blocking all avenues of water ingress.

Another advantage of the present surge arrester design is that sidewall 28 of gasket 25 is firmly pressed against the sides of varistor element 30. If this were not so, flashover could occur. It is common in the art to apply a "collar" of a material such as epoxy to the sides of a varistor disk, to help prevent flashover. With the present invention, both collarless and collared varistor disks may be used, the latter as a matter of convenience because varistor disks frequently are sold already collared by the manufacturer.

Optionally, as shown in FIG. 5, the interior faces of contact plates 36 and 41 are slightly less than coextensive with the faces of varistor element 30. When gasket 25 is pressed against housing 10, it may pinch inwards. If the contact plates are not slightly indented, as shown, the pinching action may lift them away from electrical contact with varistor element 30. Alternatively, the edges of contact plates 36 and 41 (especially the latter) may be beveled, with the bevel facing away from varistor element 30.

Returning to FIG. 1, other features of the invention shown there are discussed. A ground wire lead 47 is connected to shank 37 by hex nuts 46. Housing 10 has, at its lip, a tab 14 to which the other end of lead 47 and a ground wire (not shown) are connected and secured via hex bolt 51 (passing through a through-hole in tab 14), lock washer 52, and nut plate 53.

In the event of a persistent overvoltage or other malfunction which causes varistor element 30 to carry large amounts of current for an extended time, varistor element 30 may overheat and fail explosively, posing a hazard to nearby equipment or personnel. Therefore, surge arrester 1 preferably has a means for disconnecting the connection between system and ground before an overheated varistor element fails explosively. Such a means is described following. Shank 37 is affixed to contact plate 36 by an electrically conductive, fusible material 38, such as solder. A label plate 49 is attached to shank 37 by acorn nut 50. A spring 48 is compressed between lid 20 and label plate 49, the latter giving spring 48 purchase to push against shank 37. Spring 48 exerts a tensile force tending to move shank 37 away from contact plate 36 and to electrically disconnect the two (thus severing the link in surge arrester 1 between system and ground), but the force is insufficient to so move shank 37 unless fusible material 38 is in its fused state. If sufficient current passes through varistor element 30, the local temperature rises enough to melt fusible material 38, so that spring 48 can push shank 37 away from contact plate 36, breaking the electrical connection. It is to be understood that when it is stated herein that fusible material 38 fuses or melts or is in a fused state, this means not only the condition in which it is actually molten, but also those conditions in which fusible material 38 softens or otherwise weakens so that it is no longer capable of resisting the force applied by spring 48 and hold shank 37 and contact plate 36 connected to each other. The movement of shank 37, ejecting it from the main body of surge arrester 1, provides a clear indicator of the disconnection, permitting facile visual monitoring from a distance, without the need to touch surge arrester 1 or to shut down the system. Since surge arrester 1 is often installed on outdoor overhead lines carrying dangerously high voltages at all times, this is a substantial advantage. Further, only a few parts are ejected (and in a predetermined direction, straight down), in contrast to the instance of explosive failure, in which the entire surge arrester may shatter and pieces are ejected in all directions, with shrapnel-like effect.

Label plate 49 provides a convenient location for displaying information such as the manufacturer's identity, part number, and/or product specifications.

Additional optional features or alternative embodiments of the invention are described following.

As an alternative to beveling contact plate 41, as discussed above, the interior face of the end of sidewall 28 can be beveled, as shown in FIG. *6a*.

Gasket 25 need not be made from a single integral piece of material, although such an embodiment is preferred. As shown in FIG. *6b*, gasket 25 can be of multi-piece construction, for example comprising a short, squat tubular piece 28' and a separate disk-shaped base piece 29'.

FIG. *6c* shows an alternative embodiment in which electrode 40 is of one-piece construction.

Housing 10 need not have a tapered sidewall 11 as shown in FIG. 1. FIG. *6d* shows how, instead, the outer surface of sidewall 11 can be substantially straight (perpendicular relative to base while the interior surface is tapered. As gasket 25 is slid or nested inside housing 10 as indicated by arrow H, the interior taper provides the interference for a seal. Optionally gasket 25 also may be tapered. Yet another alternative design is shown in FIG. *6e*, where both the interior and exterior surfaces of sidewall 11 are straight, but an effective seal is nevertheless formed because sidewall 28 of gasket 25 includes a circumferential ridge 61 providing a tight interference fit.

The engagement means for retaining lid 20 in place need not be a groove 13 as discussed hereinabove. Those skilled in the art will appreciate that other means may be used. For example, a plurality of barbs 62 may be used, as shown in the top, cross-sectional view of housing 10 in FIG. *6f*. FIG. *6g* shows in a partial longitudinal cross-sectional view another alternative embodiment, in which lid 20 is engaged and retained by mushroom-shaped stakes 63 passing through peripheral holes 64 in lid 20. Or, the interior surface of sidewall 11 can be smooth initially, but, when lid 20 is inserted into housing 10 with the aid of an insertion tool, the insertion tool deforms material along the interior of sidewall 11 to form an engagement means.

The sealing element for through-hole 15 is not limited to O-ring 45. For example, the sealing means can be an axially compressed gasket 65 disposed between electrode 40 and base 12, as shown in FIG. *6h*.

The surge arrester of the instant invention optionally may be provided with yet another safety feature in combination with the disconnect feature discussed supra. As noted, the disconnect feature results in the downward ejection of components from housing 10. Housing 10 may include a means for capturing the components so ejected to prevent those from injuring people or damaging equipment positioned directly below the surge arrester. Such means may be a net or mesh 66 suspended below housing 10, as shown in FIG. *6i*. Or, instead of a net or mesh, it may be of a solid construction, e.g., a saucer-shaped piece. The capturing means can be made separately and then attached to housing 10, or it may be formed integrally with housing 10. Another capturing means comprises plural sets of barbs 62, arranged in a ratchet-like sequence as shown in FIG. *6j*, such that the first set of barbs 62 retains lid 20 in a tight fit with housing 20, but when the disconnect mechanism operates, the second set of barbs captures lid 20 but permits pressure relief.

Tracking and/or erosion are concerns for surge arresters exposed to moisture, such as in outdoor installations. The degree of susceptibility to tracking and erosion is dependent on the materials of construction, the creepage length, and the design of the surge arrester. In surge arrester 1, the creepage length is the distance between through-hole 15 (where shank 42 protrudes from the housing) and tab 14 (where lead 47 is attached). If any water puddles collects around either location or anywhere in between, the creepage length is reduced by an extent corresponding to the size of the puddles. Therefore, it is preferable that the surge arrester be provided with a water shedding means, to reduce the accumulation of water on the exterior surfaces of the housing.

Designs for addressing this issue are shown in FIGS. *7a–7c* and *8a–8b*. FIGS. *7a–7c* show in cross-section base 12 of housing 10. Base 12 may have an optional mesa 17 centered around through-hole 15, to provide a flat surface for bolting in or otherwise attaching electrical or other hardware to surge arrester 1. If mesa 17 has perpendicular sides, as shown in FIG. *7a*, water can collect at their base, as indicated by arrow F. But if the exterior surface of base 12 is radially sloped outwards, as shown in FIG. *7b* and *7c* (arrow F'), then water will run off instead of accumulating. The outward slope may be along the entire radius of base 12, as shown in FIG. *7c*, or along a part of it, as shown in FIG. *7b*. FIG. *8a–8b* show how tab 14 may be supported by reinforcing buttresses 18. The junctions of buttresses 18 with the main body of housing 10 also may contain corners where water can collect (arrow G). This problem is overcome by including fillets 19 to round off the corners so that water is easily shed (arrow G'). In summary, it is desirable to avoid sharp corners or radii which provide collection points for water puddles which shorten the creepage length and make the surge arrester more susceptible to tracking and/or erosion. While the designs of FIGS. *7a* and *8a* are less preferred from the viewpoint of water shedding, it is to be understood that they nevertheless are within the scope of this invention.

Electrodes 35 and 40 can be made of a suitable metal or metal alloy such as aluminum, copper, brass, steel, nickel, and the like. A corrosion resistant metal or alloy is of course preferable where there is exposure to the external environment.

Housing 10 and lid 20 are made of a suitable filled or unfilled polymer, such as epoxy resin, polyester, polyamide (e.g., nylon-6, nylon-6,6, nylon-6,12), high density polyethylene, aliphatic polyketone (e.g., Carilon™ from Shell Chemical) and polypropylene. The polymer may be filled with additives customary in the art, including, without limitation, UV stabilizers, antioxidants, colorants, reinforcing fillers such as glass fibers, and the like.

Gaskets, O-rings, and like sealing means used in this invention are made of a suitable elastomer, such as silicone robber, butyl robber, ethylene-propylene robber (EPR), ethylene-propylene-diene monomer (EPDM) robber, polyurethane, polybutadiene, butadiene-styrene copolymer, and the like. Silicone is preferred. The elastomer may contain fillers and/or additives customary in the art. Varistor element 30 is made of varistor material, preferably a polycrystalline sintered ceramic of zinc oxide (the primary metal oxide) containing additionally minor amounts of oxides of other metals (the additive metal oxides) such as $Al_2O_3$, $B_2O_3$, BaO, $Bi_2O_3$, CaO, CoO, $CO_3O_4$, $Cr_2O_3$, FeO, $In_2O_3$, $K_2O$, MgO, $Mn_2O_3$, $Mn_3O_4$, $MnO_2$, NiO, PbO, $Pr_2O_3$, $Sb_2O_3$, $SiO_2$, SnO, $SnO_2$, SrO, $Ta_2O_5$, $TiO_2$, or combinations thereof.

In a preferred method for making varistor materials for use in this invention, soluble salt precursors of the additive metal oxides are converted to the respective oxides and hydroxides in the presence of zinc oxide powder by a precipitant, commonly ammonium hydroxide. Preferably, the additive metal oxides or their precursors are combined with the zinc oxide, and then the precipitant is added to the mixture, although the reversed mixing sequence may also be used. The additive metal oxides precipitate onto or around the zinc oxide, to form a precursor powder which is an intimate mixture of zinc oxide and the additive metal oxides. The precursor powder is collected, dried, and formed into a desired shape (the green body) and sintered at an elevated temperature (typically 1,000°–1,400° C.) to develop the characteristic polycrystalline microstructure responsible for the varistor properties. During the sintering, any hydroxides are converted to the corresponding oxides. Eda et at., Japanese laid-open application no. 56-101711 (1981) and Thompson et at., U.S. Pat. No. 5,039,452 (1991), the disclosures of which are incorporated herein by reference, disclose suitable precipitation processes.

Other disclosures relating varistor materials which may be used include Matsuoka et at., U.S. Pat. No. 3,496,512 (1970); Eda et at., U.S. Pat. No. 4,551,268 (1985); and Levinson, U.S. Pat. No. 4,184,984 (1980). Additionally, varistor materials based on materials other than zinc oxide may also be used, for example silicon carbide, titanium oxide, strontium oxide, or strontium titanate varistors.

Varistor disks may have electrodes deposited on their end surfaces for improving electrical contact. The electrodes may be deposited by plasma spraying a conductor (e.g., aluminum), silk screening a conductive ink (e.g., silver ink), vacuum depositing a conductor, electroless plating, flame spraying, and the like.

The surge arrester of the present invention is especially suitable for use in power lines rated at 2 kV or less, for example on the secondary side of a transformer, in a junction box, in a service entrance panel, or in a distribution panel.

The present invention has been described in terms of various preferred embodiments. The invention, however, is not limited to the embodiments depicted and described. Rather, the scope of the invention is defined by the appended claims.

Further, the foregoing detailed description of the invention includes passages which are chiefly or exclusively concerned with particular parts or aspects of the invention. It is to be understood that this is for clarity and convenience, that a particular feature may be relevant in more than just passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extent appropriate, in the context of another figure, in combination with another feature, or in the invention in general.

What is claimed is:

1. A surge arrester, comprising (a) a first electrode having (i) a first contact plate with interior and exterior faces and (ii) a first shank projecting from the exterior face of the first contact plate;

(b) a second electrode having (i) a second contact plate with interior and exterior faces and (ii) a second shank projecting from exterior face of the second contact plate;

(c) a substantially disk-shaped varistor element, the first and second electrodes sandwiching the varistor element therebetween with the interior faces of the first and second contact plates facing the varistor element and making electrical contact therewith, to form a core assembly;

(d) a cup-shaped gasket having a sidewall and a substantially circular base with a through-hole, the gasket containing the core assembly, with the exterior face of the first contact plate facing the base of the gasket, the first shank passing through the through-hole of the base, and the second shank extending from the open end of the gasket;

(e) a housing having a sidewall and a base with a through-hole; the housing containing the core assembly and the gasket, with the open end of the gasket facing the base of the housing, the first shank extending from the open end of the housing, and the second shank passing through the through-hole in the base of the housing;

(f) a sealing element for the through-hole in the base of the housing; and (g) a lid with a through-hole, the lid covering the open end of the housing such that the first shank passes through the through-hole in the lid, being engaged and retained in place by an engagement means on the sidewall of the housing, and applying a compressive force to the gasket and the core assembly;

the varistor element being sealed from the external environment by seals between the lid and the base of the gasket; between the base of the gasket and the first contact plate; between the sidewall of the housing and the sidewall of the gasket; between the through-hole of the base of the housing and the sealing element; and between the second electrode and the sealing element.

2. A surge arrester according to claim 1, wherein the lid contains an annular ridge on the underside thereof and surrounding the through-hole therein.

3. A surge arrester according to claim 1, wherein the engagement means for engaging and retaining the lid is an annular groove on the inside of the tapered sidewall of the housing.

4. A surge arrester according to claim 1, wherein the second shank has an annular groove adjacent to the base thereof and the sealing element is an O-ring seated into the annular groove.

5. A surge arrester according to claim 1, wherein the sealing element is an axially compressed gasket disposed between the base of the housing and the second electrode.

6. A surge arrester according to claim 1, wherein the base of the housing has a recess therein, which matingly receives a complementarily sized and shaped registering element in the second electrode, thereby preventing rotation of the second shank.

7. A surge arrester according to claim 1, wherein the gasket further includes an annular protrusion disposed on the inside of the base of the gasket and surrounding the through-hole therein.

8. A surge arrester according to claim 1, wherein, in the second electrode, the second shank and the second contact plate are two separate pieces.

9. A surge arrester according to claim 8, wherein the second shank has a post at the end thereof proximate to the second contact plate, the post fitting into a hole in the second contact plate.

10. A surge arrester according to claim 1, wherein, in the second electrode, the second shank and the second contact plate form one single piece.

11. A surge arrester according to claim 1, wherein the sidewalls and the base of the gasket form one single piece.

12. A surge arrester according to claim 1, wherein the sidewall and the base of the gasket are two separate pieces.

13. A surge arrester according to claim 1, wherein the sidewall of the housing is tapered.

14. A surge arrester according to claim 1, wherein the housing further comprises a water shedding means.

15. A surge arrester according to claim 14, wherein the water shedding means is a radially outward slope on the exterior surface of the base of the housing.

16. A surge arrester according to claim 14, wherein the water shedding means is a fillet on a buttress supporting a tab on the housing.

17. A surge arrester according to claim 1, wherein, in the first electrode, the first shank is affixed to the first contact plate by an electrically conductive, fusible material and the surge arrester further comprises a disconnecting means applying a force tending to move the first shank away from the first contact plate, thereby electrically disconnecting one from the other, such force being insufficient to so move the first shank unless the electrically conductive fusible material is in its fused state.

18. A surge arrester according to claim 17, further comprising a means for capturing components of the surge arrester ejected from the housing by the disconnecting means.

19. A kit of parts for forming a surge arrester, comprising (a) a first electrode having (i) a first contact plate with interior and exterior faces and (ii) a first shank projecting from the exterior face of the first contact plate;

(b) a second electrode having (i) a second contact plate with interior and exterior faces and (ii) a second shank projecting from exterior face of the second contact plate;

(c) a substantially disk shaped varistor element, capable of forming, in combination with the first and second electrodes, a core assembly wherein the varistor element is sandwiched between the first and second electrodes with the interior faces of the first and second contact plates facing the varistor element and making electrical contact therewith;

(d) a cup-shaped gasket having a sidewall and a substantially circular base with a through-hole; the gasket capable of containing the core assembly, with the exterior face of the first contact plate facing the base of the gasket, the first shank passing through the through-hole of the base, and the second shank extending from the open end of the gasket;

(e) a housing having a sidewall and a base with a through-hole; the housing capable of containing the core assembly and the gasket, with the open end of the gasket facing the base of the housing, the first shank extending from the open end of the housing, and the second shank passing through the through-hole in the base of the housing;

(f) a sealing element for the through-hole in the base of the housing; and (g) a lid with a through-hole, the lid capable of covering the open end of the housing such that the first shank passes through the through-hole in the lid, the lid is engaged and retained in place by an engagement means on the sidewall of the housing, and the lid applies a compressive force to the gasket and the core assembly.

20. A kit of parts according to claim 19, wherein the second shank has an annular groove adjacent to the base thereof and the sealing element is an O-ring sealable into the annular groove.

21. A kit of parts according to claim 19, wherein the sealing element is a second gasket which can be axially compressed between the base of the housing and the second electrode.

22. A kit of parts according to claim 19, wherein the base of the housing has a recess therein, which matingly receives a complementarily sized and shaped registering element in the second electrode, thereby preventing rotation of the second shank in the surge arrester formed from the kit.

23. A kit of parts according to claim 19, wherein, in the first electrode, the first shank is affixed to the first contact plate by an electrically conductive, fusible material and the kit further comprises a disconnecting means applying a force tending to move the first shank away from the first contact plate in the surge arrester formed from the kit, thereby electrically disconnecting one from the other, such force being insufficient to so move the first shank unless the electrically conductive fusible material is in its fused state.

24. A surge arrester, comprising a first electrode having (i) a first contact plate with interior and exterior faces and (ii) a first shank projecting from the exterior face of the first contact plate; the first shank being affixed to the first contact plate by an electrically conductive, fusible material;

(b) a second electrode having (i) a second contact plate with interior and exterior faces and (ii) a second shank projecting from exterior face of the second contact plate, the second shank having an annular groove adjacent to the base thereof;

(c) a substantially disk-shaped varistor element, the first and second electrodes sandwiching the varistor element therebetween with the interior faces of the first and second contact plates facing the varistor element and making electrical contact therewith, to form a core assembly;

(d) an O-ring seated into the annular groove of the second shank;

(e) a cup-shaped gasket having a sidewall, a substantially circular base with a through-hole, and an annular protrusion disposed on the inside of the base of the gasket and surrounding the through-hole therein; the gasket containing the core assembly, with the exterior face of the first contact plate facing the base of the gasket, the first shank passing through the through-hole of the base, and the second shank extending from the open end of the gasket;

(f) a housing having a tapered sidewall and a base with a through-hole; the housing containing the core assembly and the gasket, with the open end of the gasket facing the base of the housing, the first shank extending from the open end of the housing, and the second shank passing through the through-hole in the base of the housing; the base of the housing having a recess therein, which matingly receives a complementarily sized and shaped registering element in the second electrode, thereby preventing rotation of the second shank;

(g) a lid with a through-hole, the lid having an annular ridge on the underside thereof and surrounding the through-hole therein, covering the open end of the housing such that the first shank passes through the through-hole in the lid, being engaged and retained in place by an annular groove on the sidewall of the housing, and applying a compressive force to the gasket and the core assembly; and (h) means for applying a force tending to move the first shank away from the first contact plate, thereby electrically disconnecting one from the other, such force being insufficient to so move the first shank unless the electrically conductive, fusible material is in its fused state;

the varistor element being sealed from the external environment by seals between the lid and the base of the gasket; between the base of the gasket and the first contact plate; between the tapered sidewall of the housing and the sidewall of the gasket; between the through-hole of the base of the housing and the O-ring; and between the second shank and the O-ring.

* * * * *